(No Model.)

W. I. LEGGETT.
STRAINER.

No. 508,175. Patented Nov. 7, 1893.

Witnesses:

Inventor
Walter I. Leggett.
By James J. Shehy
Attorney

UNITED STATES PATENT OFFICE.

WALTER I. LEGGETT, OF GALESBURG, ILLINOIS.

STRAINER.

SPECIFICATION forming part of Letters Patent No. 508,175, dated November 7, 1893.

Application filed April 25, 1893. Serial No. 471,792. (No model.)

*To all whom it may concern:*

Be it known that I, WALTER I. LEGGETT, a citizen of the United States, residing at Galesburg, in the county of Knox and State of Illinois, have invented certain new and useful Improvements in Strainers; and I do declare the following to be a full, clear, and exact description of the invention, such as will enable others skilled in the art to which it appertains to make and use the same.

My invention relates to improvements in devices for straining tea, coffee, fruit and the like; and it has for its general object to provide a strainer embodying such a construction that when it is placed over the mouth of a jar or other vessel, it will not prevent a person from looking down into the jar or other vessel so as to see the height of the contents thereof, and will not prevent the escape of steam and hot gases that may be generated by the contents of the jar or vessel.

Another object of the invention is to provide a strainer so constructed that when it is placed over the mouth of a jar or the like, it will not be liable to casual displacement, and still another object of the invention is to provide a strainer embodying such a construction that the wire gauze or other filtering material may be readily removed when worn or damaged and a new gauze or material placed in position without the employment of skilled labor or tools.

With the foregoing ends in view the invention will be fully understood from the following description and claim when taken in conjunction with the accompanying drawings, in which—

Figure 1:
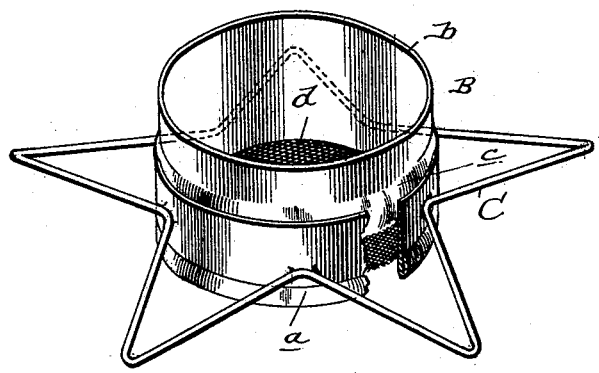
Figure 2:
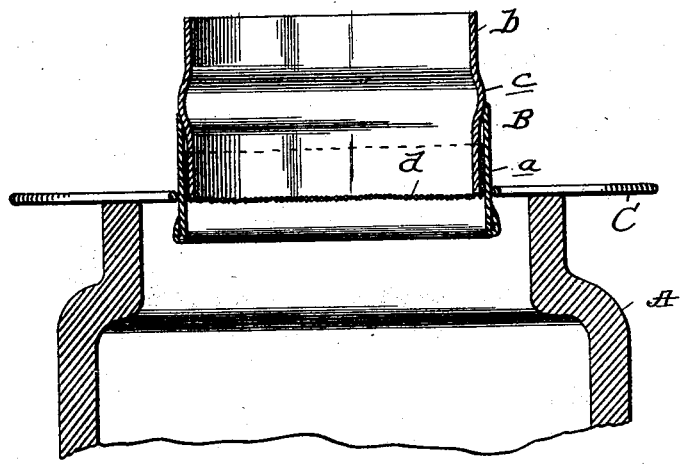

Figure 1 is a perspective view of my improved strainer with parts broken away to better illustrate the invention, and Fig. 2 is a vertical, diametrical section of the strainer in position upon a jar.

Referring by letter to the said drawings: A, indicates a jar or other vessel upon which my improved strainer may be mounted, and B, indicates the body of the strainer which comprises the fixed tubular section $a$, and the removable tubular section $b$, which fits tightly within the section $a$, as shown. This tubular section $b$, is provided with a peripheral rib $c$, to limit its downward adjustment, and it is designed and adapted to securely hold the upturned edge of the wire gauze or straining cloth $d$, which is interposed between said section $b$, and the section $a$, as illustrated. By this manner of securing the gauze or straining cloth in position, it will be seen that said cloth or gauze may be removed, when worn or damaged, by simply pulling the section $b$, out of the section $a$, and a new gauze or cloth may be readily placed and secured in position without the employment of skilled labor or tools which is an important advantage, as is obvious. The rib $c$, is formed by bellying or pressing the metal of the section $b$, outwardly, and it serves in addition to limiting the downward movement of said section $b$, to increase the friction between the sections $a$, and $b$, so as to prevent casual disconnection of the same.

C, indicates the supporting frame of the strainer, which is preferably formed from a single piece of wire and is preferably of a general star shape as illustrated. This frame C, rests in a horizontal position as shown, and it comprises a series of loops $e$, which have their inner angles connected to the section $a$, of the body at an intermediate point in the height thereof, whereby it will be seen that when the strainer rests upon the top of a jar or the like, the body section $a$, will depend within the mouth of the jar and will consequently prevent casual displacement of the strainer.

By reason of the supporting frame C, being formed from wire as described, it will be seen that when the device is placed upon a jar or other vessel as illustrated in Fig. 2, a person may look down into the jar or the like to ascertain the height of the liquid which he is pouring into the same, and may thus avoid the objectionable overflow so often experienced. Furthermore it will be seen that when the device is employed to strain hot fruit or other liquids or semi-liquids, the openwork frame will offer no impediment to the escape of the steam and hot gases which arise from the fruit or liquids.

It will be noted from the foregoing description taken in connection with the drawings, that my improved strainer may be constructed at a slight cost; that it may be readily cleansed after use, and that it will last for an indefinite length of time with ordinary usage;

the wire gauze or filtering medium, which is the only part liable to wear out, being adapted to be readily removed and replaced by a new gauze or filter cloth. It will also be noted that when not in use the device may be hung from a nail or the like; any of the points of the star shaped frame being adapted to be used as a hanger, and also as a handle to move it with from vessel to vessel.

Having described my invention, what I claim, and desire to secure by Letters Patent, is—

As an improved article of manufacture, the herein described strainer consisting of the tubular section $a$, the fixed, horizontal frame C, formed from a single piece of wire and comprising the laterally projecting loops $e$, connected at their inner angles to the section $a$, and adapted to serve the two fold function of a support for the strainer and a handle for the user, the tubular section $b$, having the peripheral rib $c$, at an intermediate point in its height, and the wire gauze or straining cloth covering the bottom of the section $b$, and having its upturned edge confined between the sections $a$, and $b$, all substantially as and for the purpose set forth.

In testimony whereof I affix my signature in presence of two witnesses.

WALTER I. LEGGETT.

Witnesses:
M. O. WILLIAMSON,
FRANK L. ADAMS.